United States Patent
Dekkinga

(10) Patent No.: US 10,445,366 B2
(45) Date of Patent: Oct. 15, 2019

(54) METHODS AND SYSTEMS FOR SAVING A URL ON A DEVICE

(71) Applicant: Jaap Dekkinga, Washington, DC (US)

(72) Inventor: Jaap Dekkinga, Washington, DC (US)

(73) Assignee: Jaap Dekkinga, Bethesda, MD (US)

( * ) Notice: Subject to any disclaimer, the term of this patent is extended or adjusted under 35 U.S.C. 154(b) by 137 days.

(21) Appl. No.: 15/651,961

(22) Filed: Jul. 17, 2017

(65) Prior Publication Data
US 2019/0018895 A1    Jan. 17, 2019

(51) Int. Cl.
*G06F 16/683* (2019.01)
*G10L 19/018* (2013.01)
*G06F 16/955* (2019.01)

(52) U.S. Cl.
CPC .......... *G06F 16/683* (2019.01); *G06F 16/955* (2019.01); *G10L 19/018* (2013.01)

(58) Field of Classification Search
None
See application file for complete search history.

(56) References Cited

U.S. PATENT DOCUMENTS

| | | | | |
|---|---|---|---|---|
| 9,026,546 | B2 * | 5/2015 | Emerson, III | G10L 19/018 707/758 |
| 2002/0010941 | A1 * | 1/2002 | Johnson | H04N 21/235 725/108 |
| 2002/0178410 | A1 * | 11/2002 | Haitsma | G06K 9/00744 714/709 |
| 2005/0065976 | A1 * | 3/2005 | Holm | G11B 27/28 |
| 2007/0045415 | A1 * | 3/2007 | Usui | G11B 27/02 235/435 |
| 2012/0102124 | A1 * | 4/2012 | Hansson | G06Q 30/02 709/206 |
| 2012/0315014 | A1 * | 12/2012 | Shuster | G06Q 30/0207 386/241 |
| 2017/0235729 | A1 * | 8/2017 | Hughes | G06F 16/433 707/758 |

* cited by examiner

*Primary Examiner* — Kaveh Abrishamkar

(57) ABSTRACT

A method of storing a Tune Uniform Resource Locator (TuneURL) associated with a URL in a database includes receiving a TuneURL of a unique sequence of musical notes and a URL associated with the TuneURL; creating an audio fingerprint of the TuneURL; and storing the audio fingerprint of the TuneURL and the URL associated with the TuneURL in the database.

21 Claims, 2 Drawing Sheets

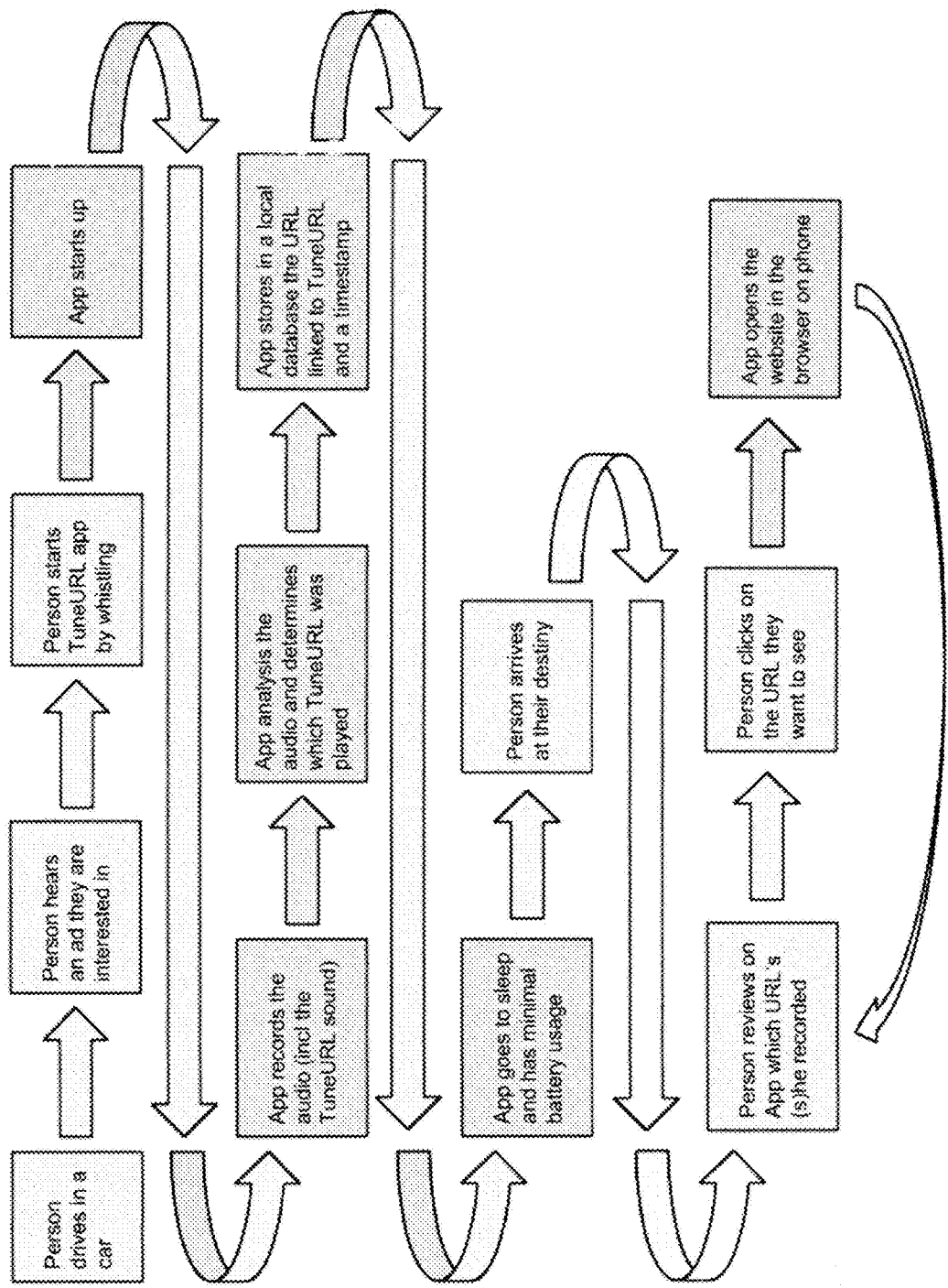

METHODS AND SYSTEMS FOR SAVING A URL ON A DEVICE

CROSS REFERENCE TO RELATED APPLICATIONS

This application claims the benefit of priority under 35 U.S.C. § 119(e) to U.S. Provisional Patent Application Ser. No. 87/194,567, filed on Jul. 19, 2016, and titled "A system and method for saving URLs of radio items on a mobile device," the entire disclosure of which is hereby incorporated by reference in its entirety for all purposes.

TECHNICAL FIELD OF THE INVENTION

The present invention generally relates to the field of communication information, and more particularly, to systems and methods for saving Uniform Resource Locators (URLs) broadcasted and heard a radio on a mobile device.

BACKGROUND OF THE INVENTION

Online shopping is a form of electronic commerce that allows consumers to directly buy goods or services from an online seller over the Internet using a web browser. Online stores often use online advertising for marketing their goods and services to online consumers. This includes email marketing, search engine marketing (SEM), social media marketing, many types of display advertising such as web banner advertising, and mobile advertising. In addition, online stores also advertise their goods and services using more traditional methods including radio and television advertising referencing their URLs due to the significant exposure these media present. However, most online stores are reluctant to spend their marketing dollars on radio and television advertising due to the difficulties of selling to an offline consumer. Further, it may be inconvenient or impossible for the public listening to their various devices to remember or write down information relating to various audio items, e.g. an advertisement being sold online, or an event or news story being displayed online, while they are away from home. Therefore, there remains a need in the art for systems and methods for saving URLs relating to various audio items as heard by the public while listening to their various devices.

SUMMARY OF THE INVENTION

The disclosure addresses these problems and more by providing a method and system for saving a URL broadcasted and heard a radio on a mobile device.

Thus, in one embodiment the disclosure provides a method of storing a Tune Uniform Resource Locator (TuneURL) associated with a URL in a database, which includes: receiving a TuneURL of a unique sequence of musical notes and a URL associated with the TuneURL; creating an audio fingerprint of the TuneURL; and storing the audio fingerprint of the TuneURL and the URL associated with the TuneURL in the database.

In one aspect, the disclosure provides a method of storing a TuneURL associated with a URL in a database, which further includes: receiving a title of an audio item associated with the TuneURL and the URL associated with the TuneURL; and storing the title of the audio item with the audio fingerprint of the TuneURL and the URL associated with the TuneURL in the database.

In another aspect, the disclosure provides a method of storing a TuneURL associated with a URL in a database, wherein the TuneURL and the URL associated with the TuneURL is received at a web service.

In another aspect, the disclosure provides a method of storing a TuneURL associated with a URL in a database, wherein the TuneURL is a unique sequence of musical notes.

In another aspect, the disclosure provides a method of storing a TuneURL associated with a URL in a database, wherein the unique sequence of musical notes is from about 3 seconds to about 7 seconds long.

In another embodiment, the disclosure provides a method of saving a URL on a mobile device, which includes: activating a TuneURL app running in a background on the mobile device via at least one trigger in response to an audio item; recording a TuneURL associated with the audio item; matching the recorded TuneURL with an audio fingerprint of a TuneURL associated with a URL in a database of known audio fingerprints of TuneURLs associated with their URLs; and saving the matched URL on the mobile device.

In one aspect, the disclosure provides a method of saving a URL on a mobile device, which further includes: deleting the recorded TuneURL if a user of the mobile device is not interested in the audio item, or sending the recorded TuneURL to a web service if the user of the mobile device is interested in the audio item.

In another aspect, the disclosure provides a method of saving a URL on a mobile device, which further includes the web service: matching the recorded TuneURL with an audio fingerprint of a TuneURL associated with a URL in a database of known audio fingerprints of TuneURLs associated with their URLs; and transmitting the best matched URL to the mobile device.

In another aspect, the disclosure provides a method of saving a URL on a mobile device, which further includes: allowing the TuneURL app on the mobile device to go to sleep with minimal device battery usage after saving the best matched URL on the mobile device.

In another aspect, the disclosure provides a method of saving a URL on a mobile device, which further includes: opening the matched URL on the mobile device; and displaying the matched URL on an internet page in a browser of the mobile device.

In another aspect, the disclosure provides a method of saving a URL on a mobile device, wherein the TuneURL and corresponding URL are marked with a timestamp.

In another aspect, the disclosure provides a method of saving a URL on a mobile device, wherein the TuneURL is from about 3 seconds to about 7 seconds.

In another aspect, the disclosure provides a method of saving a URL on a mobile device, wherein the mobile device is a smartphone or tablet computer.

In another aspect, the disclosure provides a method of saving a URL on a mobile device, wherein the audio item is played on a radio or television.

In another embodiment, the disclosure provides a system, which includes: a mobile device having a TuneURL app; and a database of stored audio fingerprints of TuneURLs associated with their corresponding URLs, wherein a TuneURL app running in a background on the mobile device is activated via at least one trigger in response to an audio item, wherein a TuneURL associated with the audio item is recorded, wherein the recorded TuneURL is matched with an audio fingerprint of a TuneURL associated with a URL in the database of stored audio fingerprints of TuneURLs associated with their URLs, and wherein the matched URL is saved on the mobile device.

In one aspect, the disclosure provides a system, wherein the recorded TuneURL is deleted if a user of the mobile device is not interested in the audio item, or the recorded TuneURL is sent to a web service if the user of the mobile device is interested in the audio item.

In another aspect, the disclosure provides a system, the recorded TuneURL is matched with an audio fingerprint of a TuneURL associated with a URL in a database of known audio fingerprints of TuneURLs associated with their URLs at a website; and the best matched URL is transmitted to the mobile device.

In another aspect, the disclosure provides a system, wherein the TuneURL app on the mobile device goes to sleep with minimal device battery usage after saving the best matched URL on the mobile device.

In another aspect, the disclosure provides a system, wherein the matched URL is opened on the mobile device, and wherein the matched URL is displayed on an internet page in a browser of the mobile device.

In another aspect, the disclosure provides a system, wherein the TuneURL and corresponding URL are marked with a timestamp.

BRIEF DESCRIPTION OF THE DRAWINGS

FIG. 2 illustrates an embodiment of a method of saving a URL on a mobile device.

DETAILED DESCRIPTION OF THE EMBODIMENTS

Figure 1:
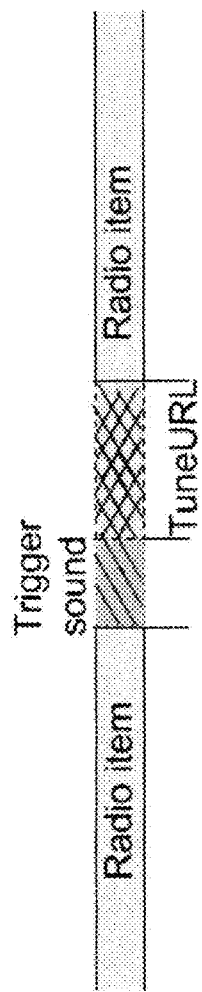
FIG. 1 illustrates an embodiment of recording a TuneURL and audio item by an app on a device.

The disclosure provides methods and systems for saving a URL on a mobile device when it is inconvenient or impossible to write down the URL by hand. For example, when driving an automobile, it is not safe for the driver to type in or write down a URL beard on the radio directed to an interesting news story or advertisement. Nor is it convenient to type in or write down a URL when relaxing and watching television. The disclosure provides methods and systems that solves these problems using a mobile device, an app, a trigger, a web service, a musical sonification of the URL of the internet page of the item, i.e. a TuneURL, and a database for storing an audio fingerprint of the TuneURL along with the URL and title.

Musical sonification provides a data transformation of a URL such that the relations in the data are manifested in corresponding musical relations. That is, a TuneURL provides a unique sequence of musical notes of from about 3 to about 7 seconds long that provides a 1-on-1 correspondence to the URL. Musical sonification can generate "pleasing" musical sounds. As used herein, "music" or "musical" refers to the science or art of ordering tones or sounds in succession, in combination, and in temporal relationships to produce a composition having unity and continuity. Although the music used in the disclosed systems and methods may be common-practice music and the exemplary embodiments use western musical concepts to produce pleasing musical sounds, the terms "music" and "musical" are not to be limited to any particular style or type of music.

To create a TuneURL, a website owner (or their representative) first associates the internet page URL with the radio or television item. Next, a unique sequence of notes, of form about 3 seconds to about 7 seconds duration, is associated with the URL, i.e. the TuneURL. A title that describes the radio or television item is assigned to the TuneURL. Finally, an audio fingerprint of the TuneURL, i.e. the unique sequence of notes, is created and the information relating to the URL, title, and audio fingerprint are stored in a database. For convenience, the website owner (or their representative) can send this information to a webservice, who can then create the TuneURL and audio fingerprint, which along with the above information can be stored in an offsite or local database.

As used herein, the term "app" is shorthand for "software application." A mobile software application or mobile app is a software application designed to run on a mobile device such as a smartphone or tablet computer. Mobile apps often stand in contrast to desktop applications that run on desktop computers, and with web applications, which run in mobile web browsers rather than directly on the mobile device.

Thus, in one embodiment the disclosure provides a method of storing a TuneURL associated with a URL in a database, which includes; receiving a TuneURL of a unique sequence of musical notes and a URL associated with the TuneURL; creating an audio fingerprint of the TuneURL; and storing the audio fingerprint of the TuneURL and the URL associated with the TuneURL in the database.

In one aspect, the disclosure provides a method of storing a TuneURL associated with a URL in a database, which further includes: receiving a title of an audio item associated with the TuneURL and the URL associated with the TuneURL; and storing the title of the audio item with the audio fingerprint of the TuneURL and the URL associated with the TuneURL in the database.

In another aspect, the disclosure provides a method of storing a TuneURL associated with a URL in a database, wherein the TuneURL and the URL associated with the TuneURL is received at a web service.

In another aspect, the disclosure provides a method of storing a TuneURL associated with a URL in a database, wherein the TuneURL is a unique sequence of musical notes.

In another aspect, the disclosure provides a method of storing a TuneURL associated with a URL in a database, wherein the unique sequence of musical notes is from about 3 seconds to about 7 seconds long.

The use of a trigger in response to an audio item, e.g. an audio advertisement or an audio news story and the like, transmitted from a radio or television and the like, that activates the app and saves the URL of the item the user is interested in with minimal action by the user. This allows the user to keep their full attention to the road and other traffic, or to continue relaxing and watching television. Those skilled in the art will understand that different mechanisms to detect the trigger may be used, which may utilize devices such as a CPU, a CODEC or a driver. That is, other software and/or hardware may be used to discriminate a trigger. In an embodiment, frequency sampling can be used to determine a specific triggering sound or a sequence of sounds that indicate a trigger has occurred. In another embodiment, the amplitude of the sound signal can be used. Those skilled in the art will understand that there are other types of mechanisms that may be used to detect a trigger including but not limited to a tap, a swipe, a shake, a voice command, a whistle, finger-snap, a hand-clap or any other convenient way to express an interest.

The app can be continuously running in the background on a user's mobile device. Once the app has been triggered by a trigger in response to an audio item transmitted through a radio or television, the TuneURL (and the audio item) can then be recorded, and matched to the audio fingerprint of the TuneURL stored in the database.

FIG. 1 illustrates an embodiment of recording a TuneURL and audio item by an app on a device.

Once the TuneURL and audio item has been recorded, the app presents a decision screen to the user:

Option 1—user is not interested: The app will delete the recorded audio and the app returns to the background of the user's mobile device;

Option 2—user is interested: The app sends the recorded audio to the webservice, which then creates an audio fingerprint of the recorded audio. The webservice compares the audio fingerprint of the recorded audio to all the stored audio fingerprints in the webservice's database and selects the best match. The webservice returns the information along with a timestamp of the best matched record back to the user's mobile device. The app persists by the webservice returned information.

The user can then open the app on their mobile device, view a list of saved URLs, choose the URL that interests them and can share the URL with one of their contacts, or open the URL in a web browser on their device.

Thus, in another embodiment the disclosure provides a method of saving a URL on a mobile device, which includes: activating a TuneURL app running in a background on the mobile device via at least one trigger in response to an audio item; recording a TuneURL associated with the audio item; matching the recorded TuneURL with an audio fingerprint of a TuneURL associated with a URL in a database of known audio fingerprints of TuneURLs associated with their URLs; and saving the matched URL on the mobile device.

In one aspect, the disclosure provides a method of saving a URL on a mobile device, which further includes: deleting the recorded TuneURL if a user of the mobile device is not interested in the audio item, or sending the recorded TuneURL to a web service if the user of the mobile device is interested in the audio item.

In another aspect, the disclosure provides a method of saving a URL on a mobile device, which further includes the web service: matching the recorded TuneURL with an audio fingerprint of a TuneURL associated with a URL in a database of known audio fingerprints of TuneURLs associated with their URLs; and transmitting the best matched URL to the mobile device.

In another aspect, the disclosure provides a method of saving a URL on a mobile device, which further includes: allowing the TuneURL app on the mobile device to go to sleep with minimal device battery usage after saving the best matched URL on the mobile device.

In another aspect, the disclosure provides a method of saving a URL on a mobile device, which further includes: opening the matched URL on the mobile device; and displaying the matched URL on an internet page in a browser of the mobile device.

In another aspect, the disclosure provides a method of saving a URL on a mobile device, wherein the TuneURL and corresponding URL are marked with a timestamp.

In another aspect, the disclosure provides a method of saving a URL on a mobile device, wherein the TuneURL is from about 3 seconds to about 7 seconds.

In another aspect, the disclosure provides a method of saving a URL on a mobile device, wherein the mobile device is a smartphone or tablet computer.

In another aspect, the disclosure provides a method of saving a URL on a mobile device, wherein the audio item is played on a radio or television.

In another embodiment, the disclosure provides a system, which includes: a mobile device having a TuneURL app; and a database of stored audio fingerprints of TuneURLs associated with their corresponding URLs, wherein a TuneURL app running in a background on the mobile device is activated via at least one trigger in response to an audio item, wherein a TuneURL associated with the audio item is recorded, wherein the recorded TuneURL is matched with an audio fingerprint of a TuneURL associated with a URL in the database of stored audio fingerprints of TuneURLs associated with their URLs, and wherein the matched URL is saved on the mobile device.

In one aspect, the disclosure provides a system, wherein the recorded TuneURL is deleted if a user of the mobile device is not interested in the audio item, or the recorded TuneURL is sent to a web service if the user of the mobile device is interested in the audio item.

In another aspect, the disclosure provides a system, the recorded TuneURL is matched with an audio fingerprint of a TuneURL associated with a URL in a database of known audio fingerprints of TuneURLs associated with their URLs at a website; and the best matched URL is transmitted to the mobile device.

In another aspect, the disclosure provides a system, wherein the TuneURL app on the mobile device goes to sleep with minimal device battery usage after saving the best matched URL on the mobile device.

In another aspect, the disclosure provides a system, wherein the matched URL is opened on the mobile device, and wherein the matched URL is displayed on an internet page in a browser of the mobile device.

In another aspect, the disclosure provides a system, wherein the TuneURL and corresponding URL are marked with a timestamp.

In other embodiments, the TuneURL can be used in stores and restaurants by playing a TuneURL and directing customers to a website, e.g., that displays that day's deals or menu.

In other embodiments, the TuneURL can be linked to the beginning of a song and linked to the URL to download and/or buy the song.

In other embodiments, the TuneURL can be used at conventions or seminar to direct customers to a website, e.g. an agenda of speakers.

In other embodiments, the TuneURL can be used in a car to trigger a device to call a specific number.

Examples

FIG. 2 illustrates an embodiment of a method of saving a URL on a mobile device. The steps include but are not limited to:

1. A person is driving in a car with a radio (or any other audio device) turned on and being audible.

2. The person listening hears an advertisement, news story or any other item of interest, i.e. an audio item, playing on the radio that they are interested in.

3. A TuneURL app starts up automatically on their device by initiating a trigger sound.

4. The app on their device is then initiated and starts.

5. The app records the TuneURL being played.

6. The user decided if they are interested in the radio item. If they are interested, the user will indicate their interest by an action (e.g. swipe on the app, whistle). The app then sends the recorded audio file (e.g. MP3) to a web service. The web service then analyzes the TuneURL and determines which TuneURL was being played. The web service retrieves the corresponding URL and other information related to the determined TuneURL. The web service then sends all the retrieved information back to the device.

7. The app stores in a local database the URL linked to the requested TuneURL and a timestamp.

8. The app then goes to sleep in the background and has minimal battery usage.

9. The person arrives at their destination.

10. The person reviews on the app which URLs they recorded.

11. The person clicks on the URL they want to see.

12. The app opens the URL (website) in a browser on their device.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method of using app technology to retrieve the radio item's associated URL while, comprising:
    activating a TuneURL app technology running in a background on the mobile device via the trigger sound in response to a TuneURL played after the conclusion of a radio item, wherein the TuneURL is a unique audio tag that is generated independently of the radio item the TuneURL is associated with; and
    receiving a record in the database containing the radio item's associated URL, which is associated with the TuneURL;
    creating an audio fingerprint of the TuneURL; and
    storing the audio fingerprint of the TuneURL and the URL associated with the TuneURL in the database.

2. The method of claim 1, further comprising:
    receiving a title of the radio item associated with the TuneURL and the URL associated with the TuneURL; and
    storing the title of the radio item with the audio fingerprint of the TuneURL and the URL associated with the TuneURL in the database.

3. The method of claim 1, wherein the title and the associated URL of the radio item associated with the TuneURL are received at a web service.

4. The method of claim 1, wherein the TuneURL is from about 3 seconds to about 7 seconds long.

5. The method of claim 1, wherein the radio item is a radio advertisement or a radio news story.

6. A method of saving a Uniform Resource Locator (URL) on a mobile device, comprising:
    activating a TuneURL app technology running in a background on the mobile device via a trigger sound in response to a TuneURL played after the conclusion of a radio item, wherein the TuneURL is a unique audio tag that is generated independently of the radio item the TuneURL is associated with;
    recording a TuneURL associated with the radio item;
    matching the recorded TuneURL with an audio fingerprint of a TuneURL associated with the URL in a database of known audio fingerprints of TuneURLs associated with their URLs; and
    saving the matched URL on the mobile device.

7. The method of claim 6, further comprising:
    deleting the recorded TuneURL if a user of the mobile device is not interested in the radio item, or
    sending the recorded TuneURL to a web service if the user of the mobile device is interested in the radio item.

8. The method of claim 7, further comprising the web service:
    matching the recorded TuneURL with an audio fingerprint of a TuneURL associated with a URL in a database of known audio fingerprints of TuneURLs associated with their URLs; and
    transmitting the best matched URL to the mobile device.

9. The method of claim 6, further comprising:
    allowing the TuneURL app technology on the mobile device to go to sleep with minimal device battery usage after saving the matched URL on the mobile device.

10. The method of claim 6, further comprising:
    opening the matched URL on the mobile device; and
    displaying the matched URL on an internet page in a browser of the mobile device.

11. The method of claim 6, wherein the TuneURL and matched URL are marked with a timestamp.

12. The method of claim 6, wherein the TuneURL is from about 3 seconds to about 7 seconds.

13. The method of claim 1, wherein the mobile device is a smartphone or tablet computer.

14. The method of claim 6, wherein the radio item is a radio advertisement or a radio news story.

15. The method of claim 6, wherein the TuneURL is a predefined unique audio tag.

16. A system, comprising:
    a mobile device having a Tune Uniform Resource Locator (TuneURL) app technology; and
    a database of stored audio fingerprints of TuneURLs associated with their corresponding URLs,
    wherein a TuneURL app technology running in a background on the mobile device is activated via a trigger sound in response to a TuneURL after the conclusion of a radio item, wherein the TuneURL is a unique audio tag that is generated independently of the radio item the TuneURL is associated with;
    wherein the TuneURL associated with the radio item is then recorded,
    wherein the recorded TuneURL is then matched with an audio fingerprint of a TuneURL associated with the URL in the database of stored audio fingerprints of TuneURLs associated with their URLs, and
    wherein the matched URL is then saved on the mobile device.

17. The system of claim 16, wherein the recorded TuneURL is deleted if a user of the mobile device is not interested in the radio item, or the recorded TuneURL is sent to a web service if the user of the mobile device is interested in the radio item.

18. The system of claim 16, wherein the recorded TuneURL is matched with an audio fingerprint of a TuneURL associated with a URL in a database of known audio fingerprints of TuneURLs associated with their URLs at a website; and the best matched URL is transmitted to the mobile device.

19. The system of claim 16, wherein the TuneURL app technology on the mobile device goes to sleep with minimal device battery usage after saving the best matched URL on the mobile device.

20. The system of claim 16, wherein the matched URL is opened on the mobile device, and wherein the matched URL is displayed on an internet page in a browser of the mobile device.

21. The system of claim 16, wherein the TuneURL and matched URL are marked with a timestamp.

\* \* \* \* \*